April 30, 1935.  H. J. WOODALL  1,999,384
LAMINATED PANEL AND PROCESS OF MANUFACTURING SAME
Filed Jan. 18, 1934

INVENTOR.
Herbert J. Woodall
BY
Parker & Burton
ATTORNEYS

Patented Apr. 30, 1935

1,999,384

UNITED STATES PATENT OFFICE 1,999,384

LAMINATED PANEL AND PROCESS OF MANUFACTURING SAME

Herbert J. Woodall, Detroit, Mich., assignor to Woodall Industries Incorporated, Detroit, Mich., a corporation of Michigan Application January 18, 1934, Serial No. 707,077

17 Claims. (Cl. 154—2)

My invention relates to improvements in laminated panels or the like and to an improved process of fabricating and decoratively embossing the same.

An object of my invention is to provide an improved panel or the like which is inexpensive, which has a thickness that is rigid and self-supporting, and which has a surface thickness or thicknesses which respond to heat and pressure to assume and permanently retain a deformed shape, whereby such surface thickness of the panel may be decoratively embossed without destructively rupturing or breaking the rigid self-supporting thickness of the panel.

Another object is to provide a laminated panel which comprises a rigid self-supporting lamination, which may be an interior lamination or a surface lamination, and which is formed of inexpensive material such as a cheap fibrous composition board, and a surface lamination or laminations which is non rigid and non self-supporting and which possesses thermoplastic properties rendering the same responsive to heat and pressure to assume and permanently retain its deformed shape. The entire structure is of a composition fibrous material throughout and it is an integral structure. The surface lamination of thermoplastic fibrous material is of sufficient thickness to receive and permanently retain desired configurations without destructive rupturing or breaking of the rigid self-supporting lamination which carries the same.

In an automobile interior trim panel the surface lamination may be provided on one surface with a lamination of self-supporting fibrous material which is provided in such a thickness as to receive the desired embossments to give the desired decorative effect. Such surface lamination would preferably be covered in this use with a suitable upholstery trim fabric as shown.

Heretofore in the fabrication of automobile trim panels to give desired surface embossments, two methods have been followed. According to one method a panel board was provided which was inherently rigid and self-supporting but which, under heat and pressure, was responsive to assume and permanently retain a deformed shape such as would be given to it by the embossing operation. This panel board was covered with upholstery cloth and then stamped under heat and pressure to the desired shape. Upon hardening it would maintain such shape. A board of this character capable of so responding has been marketed for some time under the name of "K B" board. It is a cellulose fiber board wherein the fibers are held together by a suitable binder such as an asphaltum composition binder. The asphalt was applied in such a quantity as to render the board sufficiently thermoplastic for the purpose intended.

Possessing a sufficient amount of the thermoplastic binder to render the panel highly thermoplastic so as to facilitate the shaping thereof renders the panel subject to bending and distortion at high atmospheric temperatures if it is not kept perfectly flat at all times. Furthermore, it was necessary to provide a seal over the surface of the panel to prevent the migration of the asphalt binder compound to the surface and in to the covering material.

The other method of fabricating such a panel to obtain the appearance of surface embossment was to employ a non thermo-plastic fibrous panel board as a foundation and to provide risers in the form of beads or the like attached to one surface of this foundation board. This surface of the board provided with the risers was then covered with upholstery cloth which was stitched or otherwise secured down to the panel board along the risers. The application of the risers to the foundation board added substantially to the cost of fabrication and the operation of sewing the covering material along the edge of the upraised portions also added to the cost of construction. Such a board was not an integral unitary construction but was of a composite built-up character.

My improved panel is a unitary integral construction. It is inexpensive to fabricate. It is so built as to have only a portion of its thickness responsive to decorative embossment under heat and pressure while the remainder of its thickness maintains its rigid planar shape.

A desirable characteristic of my invention is that I provide a panel at cheap cost which is integral, which will maintain its rigid self-supporting character, which is provided on one surface at least with a relatively thick lamination of thermoplastic material that is responsive to embossing operations without destructive breaking or rupturing of the self-supporting lamination and which is of a fibrous composition character throughout.

Other objects and advantages will more fully appear from the following description, appended claims, and accompanying drawing, wherein:

Figure 1:
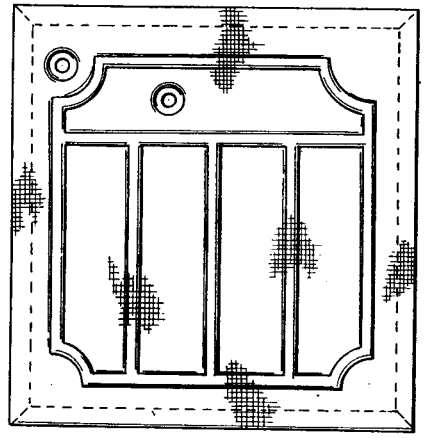
Figure 1 is an elevation of a panel embodying my invention.
Figure 2:
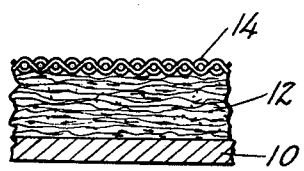
Figure 2 is a cross sectional view of a fragment of a panel embodying my invention.

That thickness of my panel which renders it rigid and self-supporting is indicated as 10. In Figure 2 it is illustrated as an outer lamination while in Figure 3, it is illustrated as an interior lamination. Each figure shows a laminated panel structure. Figure 2 illustrates a cross section through a composite structure suitable for an automobile interior trim panel such as is shown in Figure 1. This lamination 10 may be treated, if desired, to render its exposed surfaces waterproof. It may be formed of any inexpensive fibrous composition material such as cardboard or the like.

Adhesively secured to one or both outer surfaces of this lamination 10 is a second lamination 12 which is composed of loosely integrated fibrous material wherein the fibers are held together by a suitable adhesive. A preferred form is to provide scattered particles of adhesive compound such as a thermoplastic asphalt compound. This lamination 12, when uncompressed, is very loose and easily compressible.

It may be formed of a plurality of very thin film like layers of paper stock. Throughout the stock adhesive particles are scattered. These particles secure the layers together and upon compression of the material retain it at its compressed state. This layer is non rigid, highly yielding, non self-supporting, and very cheap. It is adhesively secured to the self-supporting lamination which maintains the normal shape of the composite panel by virtue of its rigid character.

The composite panel structure may then be placed between cooperating die members 18 and 20 wherein the desired embossment is imparted to the loosely integrated layer of fibrous material that possesses the thermoplastic characteristics. It is compressed as desired to bring about the required configuration of the embossment. It is not necessary to shape the rigid lamination to accomplish the embossment of the highly yielding lamination. As the loosely integrated lamination is capable of compression to a small fraction of its normal thickness it is possible to compact and densify the same through the different areas to different densities and thicknesses. It will retain the impression it has been given. This is illustrated in Figure 1 of the drawing. The panel in its original shape, prior to being acted upon by the die, is illustrated in Figure 2 of the drawing. The die 18 of the die stamping mechanism is so formed that at points 24 the composite panel is subjected to substantial compression while at points 22 the panel is not subjected to any effort of compression at all. The relief at points 22 might be such as not to exert any appreciable effort of compression upon the panel.

It is now apparent that my complete panel as shown in Figure 2 possesses a plane surface on the side of the rigid lamination which is not broken with debossments or grooves of any character and which may be applied flat to the supporting frame. Upon the opposite side the panel is provided with a lamination of thermoplastic material which may be embossed to give the outer surface the desired contour.

A covering 14 of upholstery cloth may be adhesively secured over the thermoplastic lamination. The composite panel formed of the two laminations and the cloth may then be subjected to the stamping operation and the complete panel will show a cloth covered embossed surface, the embossment being taken in the thermoplastic lamination, the other lamination retaining its normal character.

Figure 3:
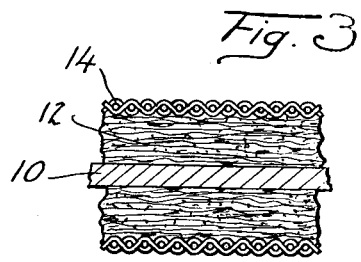
Figure 3 is a cross sectional view through a modified form of a fragment of a panel embodying my invention.
Figure 4:
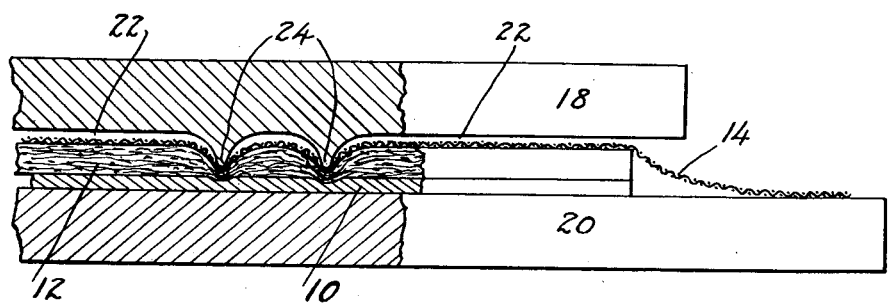
Figure 4 illustrates die stamping mechanism capable of deforming the thermoplastic surface lamination shown in Figure 2.

In Figure 3 the rigid self-supporting lamination is an interior lamination and it carries on both sides a thickness of the described thermoplastic material which renders both surfaces capable of embossment as described.

The composite panel is an integral structure. It is cheap. It is rigid and self-supporting at all temperatures. It is throughout a fibrous composition material which may be readily cut to shape. It has a thermoplastic surface thickness, which is of a relatively soft cushioning character but which is capable of permanent embossment along determined outlines to present an upholstered appearance.

What I claim:

1. A laminated panel comprising a non thermoplastic relatively rigid self-supporting lamination provided on one surface with a thick facing of loosely integrated cushion-like compressible thermoplastic fibrous material.

2. A laminated panel comprising a non thermoplastic relatively rigid self-supporting lamination and a loosely integrated compressible fibrous lamination adhesively secured to the first lamination and possessing thermoplastic characteristics and having predetermined selected portions compressed to a greater density than other selected portions.

3. A laminated panel comprising a relatively rigid self-supporting lamination of non thermoplastic material and a compressible non self-supporting loosely integrated fibrous surface lamination of thermoplastic material adhesively secured to the first lamination, said second lamination being responsive to heat and pressure to assume and permanently retain a deformed shape and having selected areas deformed and densified structurally relatively to other non deformed areas.

4. A laminated panel including two laminations of fibrous material adhesively secured together, one of said laminations having a plane outer surface and being a relatively rigid self-supporting lamination of non thermoplastic material, said other lamination being of relatively compressible non self-supporting thermoplastic material and having an embossed outer surface.

5. A laminated panel comprising an interior lamination of relatively rigid non thermoplastic material and an exterior lamination of relatively compressible loosely integrated thermoplastic material adhesively secured thereto, said second lamination having a thickness at least equal to that of the first lamination and having selected debossed areas along which the material is compacted and densified against said first lamination.

6. That process of fabricating and embossing a laminated panel comprising adhesively securing a loosely integrated compressible non self-supporting fibrous lamination possessing thermoplastic characteristics to a lamination of relatively rigid self-supporting non thermoplastic material and embossing under heat and pressure the lamination of compressible thermoplastic material.

7. A laminated panel comprising a non thermoplastic foundation lamination and a loosely integrated, downy, resilient fibrous lamination secured to the first lamination and having thermoplastic particles scattered therethrough.

8. A panel comprising an interior thickness of foundation fibrous material and a surface thickness on each side thereof of loosely integrated resilient spongy fibrous material responsive under predetermined heat and pressure to assume and permanently retain a deformed shape.

9. A panel having a portion of its thickness formed of non-thermoplastic foundation material and another portion of its thickness formed of cushion like, feathery resilient fibrous material supported by the first portion and possessing thermoplastic characteristics and having selected portions compacted and densified against the foundation lamination.

10. A laminated structure comprising a surface lamination of non-thermoplastic supporting protective fibrous material and a lamination of springy, loosely integrated cushion like fibrous material secured thereto and possessing thermoplastic characteristics, said cushion like lamination having a selected area compacted and densified against the protective lamination and surrounding an uncompressed area.

11. A laminated structure comprising two durable protective, non-thermoplastic external laminations and a layer of loosely integrated cushion-like fibrous wadding arranged therebetween, said wadding possessing thermoplastic characteristics and being compacted and densified along a plurality of lines surrounding uncompacted areas separated by said lines.

12. A laminated structure comprising a foundation lamination, a lamination of resilient cushioning material arranged on each side of the foundation lamination, the resilient lamination being formed of a multiplicity of film-like fibrous layers loosely integrated together and carrying asphalt particles responsive under predetermined heat and pressure to permanently adhere the layers together and a protective lamination extending over each lamination of cushioning material.

13. A laminated structure comprising a layer of soft fluffy fibrous asphalt impregnated material, a layer of protective covering material overlying each surface thereof, and a layer of rigidifying material arranged between said layers of covering material.

14. A laminated structure comprising an internal lamination of fluffy fibrous asphalt impregnated material and a covering lamination of non-thermoplastic material overlying each surface thereof.

15. A laminated structure comprising a lamination of fluffy fibrous asphalt impregnated material arranged between two laminations of flexible protective material and a lamination of fibrous supporting material arranged within said fluffy lamination.

16. A laminated structure comprising a lamination of fluffy fibrous asphalt impregnated material arranged between two outer laminations of flexible protective material and a lamination of closely compacted fibrous material disposed adjacent to said fluffy lamination between said outer laminations.

17. A laminated structure comprising a lamination of relatively dense fibrous material arranged between two laminations of fluffy loosely integrated fibrous material, each fluffy lamination carrying thermoplastic particles responsive to heat and pressure to be permanently compacted throughout selected areas.

HERBERT J. WOODALL.